(12) United States Patent
Kolberg et al.

(10) Patent No.: US 8,039,410 B2
(45) Date of Patent: Oct. 18, 2011

(54) CORE GLASS IN THE ALKALI-ZINC-SILICATE GLASS SYSTEM FOR AN FIBER-OPTIC LIGHT GUIDE AND FIBER-OPTIC LIGHT GUIDE MADE WITH SAID CORE GLASS

(75) Inventors: Uwe Kolberg, Mainz (DE); Axel Curdt, Georgenborn (DE); Monika Gierke, Wiesbaden (DE); Magdalena Winkler-Trudewig, Mainz (DE); Guenther Kron, Mainz (DE); Doris Ehrt, Jena (DE)

(73) Assignee: Schott AG, Mainz (DE)

( * ) Notice: Subject to any disclaimer, the term of this patent is extended or adjusted under 35 U.S.C. 154(b) by 279 days.

(21) Appl. No.: 12/339,135

(22) Filed: Dec. 19, 2008

(65) Prior Publication Data

US 2009/0163342 A1 Jun. 25, 2009

(30) Foreign Application Priority Data

Dec. 20, 2007 (DE) .......................... 10 2007 063 463

(51) Int. Cl.
*C03C 3/095* (2006.01)
*C03C 3/078* (2006.01)
*G02B 6/02* (2006.01)
*G02B 6/00* (2006.01)

(52) U.S. Cl. ............ 501/64; 501/72; 385/141; 385/142; 385/144; 385/123

(58) Field of Classification Search .................. 501/64, 501/72, 55–63, 65–71; 385/141, 142, 144, 385/123, 124, 129–132; 428/364, 366, 375, 428/378, 379, 384, 388, 688, 689, 697, 699, 428/702, 704
See application file for complete search history.

(56) References Cited

U.S. PATENT DOCUMENTS

| | | | | |
|---|---|---|---|---|
| 4,894,303 | A | * | 1/1990 | Wu ................................. 430/13 |
| 5,033,815 | A | * | 7/1991 | Edahiro et al. ................ 385/142 |
| 5,137,850 | A | | 8/1992 | Clement et al. |
| 5,285,517 | A | * | 2/1994 | Wu ................................ 385/142 |
| 7,169,470 | B2 | | 1/2007 | Wolff et al. |
| 2009/0067792 | A1 | * | 3/2009 | Curdt et al. ................... 385/115 |

FOREIGN PATENT DOCUMENTS

| | | |
|---|---|---|
| EP | 1 452 495 | 9/2004 |
| JP | 2-293346 | 12/1990 |
| RU | 2 051 870 | 1/1996 |
| WO | 2007/104300 | 9/2007 |
| WO | 2007/104764 | 9/2007 |

OTHER PUBLICATIONS

Schott Technical Glasses, Physical and Technical Properties, Schott North America, Inc, Elmsford, NY, USA, Nov. 2007 (in English).

* cited by examiner

*Primary Examiner* — Jerry A Lorengo
*Assistant Examiner* — Noah Wiese
(74) *Attorney, Agent, or Firm* — Michael J. Striker

(57) ABSTRACT

A core glass and a fiber-optic light guide made from it and a cladding glass are described. The core glass is in the alkali-zinc-silicate system and contains, in Mol % on an oxide basis: 54.5-65, $SiO_2$; 18.5-30, ZnO; 8-20, Σ alkali metal oxides; 0.5-3, $La_2O_3$; 2-5, $ZrO_2$; 0.02-5, $HfO_2$; 2.02-5, Σ $ZrO_2$+$HfO_2$; 0.4-6, BaO; 0-6, SrO; 0-2, MgO; 0-2, CaO; 0.4-6, Σ alkaline earth metal oxides; 0.5-3, $Li_2O$, but no more $Li_2O$ than 25% of the Σ alkali metal oxides; >58.5, Σ $SiO_2$+$ZrO_2$+$HfO_2$. A molar ratio of $Na_2O/K_2O$ is from 1/1.1 to 1/0.3. A molar ratio of ZnO to BaO is greater than 3.5.

29 Claims, No Drawings

CORE GLASS IN THE ALKALI-ZINC-SILICATE GLASS SYSTEM FOR AN FIBER-OPTIC LIGHT GUIDE AND FIBER-OPTIC LIGHT GUIDE MADE WITH SAID CORE GLASS

CROSS-REFERENCE

The invention described and claimed herein below is also described in German Patent Application DE 10 2007 063 463.5-45, which was filed on Dec. 20, 2007 in Germany. The aforesaid German Patent Application provides the basis for a claim of priority of invention for the invention claimed herein below under 35 U.S.C. 119 (a) to (d).

BACKGROUND OF THE INVENTION

1. The Field of the Invention

The invention relates to a core glass in the alkali-zinc-silicate glass system for a fiber-optic light guide and a fiber-optic light guide made from this core glass.

2. The Related Prior Art

Fiber-optic light guides are increasingly widely used for light transmission in the most different engineering and medicinal fields, e.g. in general industrial engineering, in lighting and traffic engineering, in the automobile industry, in dentistry, in endoscopy, etc. Fiber-optic light guides, which comprise individual fibers assembled into a fiber bundle, are usually made from glass because of its good thermal and chemical resistance. The individual light fibers guide the light by total reflection. The most widely used light guide fibers are the step index fibers, which comprise a core made from a core glass, which has a constant index of refraction over its cross-section. The core glass is surrounded by a cladding made of cladding glass, which has a lower index of refraction than the core glass. The total reflection occurs at the boundary surface between the core glass and the cladding glass.

The amount of light, which can be coupled into this sort of fiber, is proportional to the square of the numerical aperture (NA) of the fiber and the cross-sectional area of the core fiber.

The attenuation of the light in the fiber also plays a great role as well as the numerical aperture. Thus only a glass that has a low attenuation of light can be used as a core glass. Because of the high purity requirements the raw materials for the glass melt of this sort of core glass are very expensive, which can lead to a high cost for this sort of optical fiber and thus the manufactured light guide. Furthermore toxic ingredients, such as PbO, CdO, BeO, $Tl_2O$, and $ThO_2$, can no longer be used because of environmental considerations.

Besides the light flux, which the fiber-optic light guide transmits, frequently poor transmission of color shades of the light by the light guide plays a significant role. Because of the spectral transmission dependence of the core glass, which the fiber contains, a more or less strong shift in the color location of the coupled light source occurs, which is made most notable by a yellowish tinge or tint of the light issuing from the light guide. This causes trouble in applications that require a color neutral reproduction, e.g. in medicinal endoscopy, in photographic image documentation to differentiate between healthy and malignant tissue.

The reliability of the fiber, especially in mobile applications, i.e. which depends on its resistance to aging due to stress caused by temperature changes between about −50° C. and 110° C., its resistance to mechanical stresses, especially resistance to vibration and chemical resistance to environmental influences, is of importance. Especially the hydrolytic resistance and the acid resistance of the core glass are of importance. The density of the fibers is also of importance, since it has a direct influence on the fuel consumption and load on the aircraft or automobile including the fibers. The density of the step index fiber is primarily determined by the density of the core glass.

SUMMARY OF THE INVENTION

It is an object of the present invention to provide an economically made core glass for an optical step index fiber and an optical fiber with this core glass.

It is another object of the present invention to provide core glass that especially only reacts with the cladding glass to a small degree or extent.

It is a further object of the present invention to provide a core glass and especially an optical fiber made from it, which withstands harsh conditions, for example treatment in an autoclave, and is as non-reactive as possible under these conditions, especially the core glass should be of acid resistance glass 1.

According to the invention these objects and others, which will be made more apparent hereinafter, are attained by a core glass in the alkali-zinc-silicate system for a step index fiber, which contains, in Mol % on an oxide basis:

| | |
|---|---|
| $SiO_2$ | 54.5-65 |
| ZnO | 18.5-30 |
| Σ alkali metal oxides | 8-20 |
| $La_2O_3$ | 0.5-3 |
| $ZrO_2$ | 2-5 |
| $HfO_2$ | 0.02-5 |
| $ZrO_2 + HfO_2$ | 2.02-5 |
| BaO | 0.4-6 |
| SrO | 0-6 |
| MgO | 0-2 |
| CaO | 0-2 |
| Σ alkaline earth metal oxides | 0.4-6 |
| $Li_2O$ | 0.5-3, but not more than 25% of the sum total of the amounts, in Mol % on an oxide basis, of the alkali metal oxides, |
| Σ $SiO_2 + ZrO_2 + HfO_2$ | >58.5; | wherein a molar ratio of ZnO:BaO is preferably greater than 3.5:1. Preferably the alkali metal oxides include $Na_2O$ and $K_2O$ and a molar ratio of $Na_2O:K_2O$ is 1/1.1 to 1/0.3.

The glass contains $SiO_2$ as glass former. Glass formation in this system is not possible when the concentration of $SiO_2$ is not greater than 50 Mol %. However the chemical resistance of the glass is insufficient when the concentration is just greater than 50 Mol %. To obtain the best acid resistance of the class 1.x (x=1, 2, 3) which is required here, a $SiO_2$ concentration of at least 54.5 Mol % is required, preferably at least 55 Mol %. So that the melting temperatures—and especially the refining temperatures are not too high, the glass contains a maximum of 65 Mol % of $SiO_2$. For refining temperatures of less than 1450° C. the glass contains at most 61 Mol % of $SiO_2$. The reduced refining temperature is decisive so that the glass takes up as little platinum as possible in the platinum refining chamber and thus does not attain a yellowish tint. Thus the concentration range for $SiO_2$ in the glass of the present invention is 54.5 to 65 Mol %, preferably 55 to 61 Mol %.

The glass can also contain up to 5 Mol % of $B_2O_3$ as a glass former. This ingredient lowers the viscosity curve and thus the melting temperature, the refining temperature and the processing temperature. However at concentrations higher than 5 Mol % it impairs the chemical resistance of the glass so that primarily only 0 to 1 Mol % of $B_2O_3$ are used under the limiting condition that the effective $SiO_2$ concentration c $(SiO_2)-c(B_2O_3)$ is >55 Mol %. If an especially great chemical stability is required, it is preferable to completely avoid $B_2O_3$ i.e. the glass is $B_2O_3$-free since the required viscosity properties can be obtained by including other glass ingredients. However it has been shown that $B_2O_3$ has a positive effect on the solarization properties of the glass. When great value is placed on the solarization properties while taking a somewhat poorer chemical stability into the bargain, the solarization properties of the glass can be definitely improved by including from 0.2 to 2 Mol %, especially from 1 to 2 Mol %, and preferably from 1 to 1.5 Mol % of $B_2O_3$.

The glass can also contain $P_2O_5$ as an additional glass former. However it is advantageous to keep the $P_2O_5$ amount as small as possible. If complex phosphates $MPO_3$ are used in the glass batch, they provide large amounts of Group-3d colored oxide impurities, especially $Fe_2O_3$, which can lead to undesirable discoloration of the resulting glass. Use of free $P_2O_5$ can lead to undesirable and strong exothermic batch reactions, which make the batch melting process difficult to handle and thus expensive. Furthermore this component can lead to undesirable crystallization products together with BaO, $ZrO_2$ and/or $HfO_2$. For this reason the glass of the present invention is limited to containing from 0 to 0.5 Mol % of $P_2O_5$. Preferably the glass of the present invention does not contain any $P_2O_5$, i.e. it contains no $P_2O_5$.

Finally the glass of the present invention can contain $GeO_2$ in the amount of 0 to 5 Mol % as an additional glass former. $GeO_2$ has a positive effect on the index of refraction of the glass and thus the numerical aperture of the fiber. It can contribute also to the lowering of the viscosity and reduces the crystallization of the silicate phase. Its high price is a consideration against using it in the glass of the invention. One skilled in the art must balance these benefits and disadvantages in each case to determine whether the use of $GeO_2$ is sensible economically. Although it makes sense to include $GeO_2$ for technical reasons, in most cases it should be avoided for economic reasons, because of its current high cost.

For its manufacture in conventional vessels at moderate temperatures the glass needs network modifiers in addition to network formers. Alkali metal oxides in amounts from 8 to 20 Mol %, preferably 11 to 16 Mol %, are used for that purpose. If the fraction of alkali metal oxides in the glass is greater than 20 Mol % the chemical resistance suffers and the thermal expansion coefficient is increased too much, which leads to an increased tendency to crack. If the amount of alkali metal oxides is less than 8 Mol %, it is difficult to melt glass, the tendency to crystallize is increased and the thermal expansion coefficient is less than $7 \times 10^{-6} K^{-1}$, whereby the pre-stressing of the fiber described further herein below decreases and thus the resistance to mechanical stresses decreases.

The principle alkali metal oxides that are used in the glass of the invention are $Li_2O$, $Na_2O$, and $K_2O$. The use of $Rb_2O$ and $Cs_2O$ is technically possible in amounts of about up to 6 Mol %, but is of interest only in special cases because of their considerably higher price. The ratio three principle alkali metal oxides, $Li_2O$, $Na_2O$, and $K_2O$, to each other and to the alkali metal oxides in the cladding glass is of importance for the core glass application. During the fiber drawing process inter-diffusion processes of the most mobile ions, primarily the alkali metal ions, occur. These processes are desired up to a certain extent, since they lead to a chemical combination of the core and cladding glass and thus guarantee the stability of the fiber. If these processes are too strong or ions diffuse, which contribute to the formation of a crystalline phase by enriching or impoverishing the core glass or cladding glass, they become counter-productive. Thus ion concentration gradients between the core and cladding glass should be present, but they should not be too large.

Generally it is most advantageous when $Na_2O$ is the alkali metal oxide with the largest molar concentration, especially in glasses with a comparatively low $SiO_2$ content and thus higher alkali metal ion mobility. In glasses with higher $SiO_2$ content the $K_2O$ content can be almost exactly the same size as the $Na_2O$ content, but it should not exceed its nominal value.

The ratio of $Na_2O$ to $K_2O$ should thus be between 1:1.05 to 1:0.3. Especially this ratio of $Na_2O$ to $K_2O$ is preferably from 1:0.95 to 1:0.4.

Special attention must be given to the $Li_2O$ content of the glass of the present invention. The $Li^+$ ion is the most mobile component of the system and contributes to the formation of crystalline phases such as $LiAlO_2$ especially in the presence of $Al_2O_3$ and $ZrO_2$. $ZrO_2$ is, as described further herein below, absolutely necessary for adjustment of the required optical properties. The addition of $Al_2O_3$ to the core glass beyond amounts due to impurities in the raw materials of the glass batch must be avoided. Since many cladding glasses contain $Al_2O_3$, it would be really suitable to entirely avoid using $Li_2O$ in core glass, in order to minimize the danger of crystallization at the boundary surface between the core glass and the cladding glass. However there are actually a number of core glasses, which contain $Li_2O$.

When no $Li_2O$ is contained in the core glass, a cladding glass that contains $Li_2O$ will introduce $Li_2O$ into the core glass it surrounds by diffusion, which can negatively affect the optical quality of the core-cladding boundary surface.

In order to be able to combine a given core glass with different cladding glasses and to be able to make a plurality of different products, it has proven important to provide a $Li_2O$ content in the core glass. This content should be sufficiently high, in order to suppress the negative affect caused by diffusion from a $Li_2O$-containing cladding glass, and sufficiently small in order to avoid crystallization effects in $Li_2O$-free, $Al_2O_3$-containing cladding glass. As has been found by considerably effort, this object is attained by include from 0.5 to 3 Mol %, preferably from 1.0 to 2.5 Mal %, and especially preferably from 1.2 to 2.2 Mol % of $Li_2O$ in the core glass according to the invention. Furthermore the $Li_2O$ fraction of the total alkali metal oxide content should not exceed 25%, preferably 20%.

Furthermore the core glass contains ZnO in an amount of 18.5 to 30 Mol %, preferably from 20 to 25 Mol %. ZnO similarly acts as a network modifier and moreover serves to adjustment of the optical properties of the core fiber.

In contrast to the oxide ingredients described above ZnO acts as network modifier, which causes a more or less constant shift of the viscosity curve over all temperatures. ZnO causes a stronger decrease at higher temperatures and a weaker decrease to an increase at lower temperatures, i.e. a tilting of the viscosity curve. This is a very desirable property, since the viscosity during melting (T<1300° C.) and refining (T<1450° C.) should be low at as low as possible temperatures. This minimizes the reaction of the core glass with the vessel material and reduces the yellowish cast or tinting of the core glass, which is due to release of platinum from the vessel material. In order to guarantee a compatibility with suitable cladding glasses during fiber drawing, the temperature may be such that the viscosity is about $10^{6\pm1}$ dPa*s, but should not be too low, i.e. the temperature should be above 900° C. at the processing temperature $V_A$ (viscosity $10^4$ dPa*s) and the temperature should be above 680° C., preferably above 700° C., at the softening point $E_W$ (viscosity $10^{7.6}$ dPa*s).

Preferably the ZnO has a high index of refraction increment and thus the core glass has a high index of refraction and thus a high numerical aperture. Furthermore ZnO can be obtained economically in high purity (relation to color-causing impurities) because of its low cost. It transmits UV radiation comparatively far into the ultraviolet range (low self-absorption), so that the visible spectral range is hardly influenced at all by the presence of ZnO in the core glass. The combination of the high index of refraction increment, reduced self absorption and high purity make ZnO an ideal ingredient of the fiber-optic core glass, in which low attenuation is required. An additional positive characteristic of ZnO, especially in contrast to BaO, which is usually used in fiber-optic glass as the main agent for a high index of refraction, is the formation of only one single crystalline zinc-enriched phase in the $R_2O$—$ZnO$—$SiO_2$ system. Several of these troublesome phases exist in corresponding BaO(SrO) systems. For that reason the ZnO systems are preferred in contrast to the BaO systems, since they are less inclined toward crystallization in the greater concentration ranges, they are obtained in high purity and have a somewhat lower UV self-absorption. Fibers made with a core glass having a high ZnO content are characterized by a lower attenuation and a smaller tendency to crystallize than BaO based systems.

The present core glass can contain BaO, but only in minor amounts of from 0.4 to 6 Mol %, preferably in amounts from 0.4 to 5 Mol %.

Similarly ZnO like BaO provides a high refractive index increment and contributes to the dissolution of acidic ingredients, such as $SiO_2$ and $ZrO_2$, because of its high basicity like the alkali metal oxides. However BaO is more inclined to crystallize than ZnO and should be used only in the minor or subordinate amounts. Likewise ZnO is preferred on the grounds of its high purity and low self-absorption properties, as described above.

BaO can be completely or partially replaced by SrO (0 to 6 Mol %, preferably up to 5 Mol %). However no substantial advantages are obtained by doing that. SrO is more expensive than BaO at the same purity. Accordingly it is not used or only used to a minor extent. CaO and MgO (in amounts of 0 to 2 Mol % each) can similarly replace a part of the BaO, however they have a negative effect on index of refraction, acid resistance and impurity level, so that it is preferable to avoid them.

In order to attain a core glass with the satisfactory properties, the sum of the alkaline earth metal oxides should not exceed 6 Mol % and the alkaline earth metal oxide content should not be too large in comparison to the ZnO content. The molar ratio of ZnO:Σ alkaline earth metal oxides should be at least greater than 3.5:1, preferably >4:1.

The green glass system is defined by the above-mentioned ingredients. To achieve a high index of refraction with satisfactory chemical resistance and small crystallization tendency at the same time these ingredients are not sufficient and further auxiliary oxide ingredients must be called upon. Especially $La_2O_3$, $ZrO_2$ and $HfO_2$ should be mentioned as auxiliary oxide ingredients.

$La_2O_3$ is an ingredient with a high index of refraction increment and is used in a concentration range of 0.5 to 3.0, preferably 1.5 to 2.9, and especially preferably 2.0 to 2.75 Mol %. If the amount of $La_2O_3$ is less than 0.5 Mol % the index of refraction increment is too low and the desired index of refraction must be obtained by including more of other oxide ingredients, which usually have other disadvantages. For that reason the lower amounts of 0.5 to 1.5 Mol % are only used in special circumstances. With amounts above 2.75 Mol % the crystallization increases too much so that the glass can no longer be used for all fiber types, e.g. small fiber diameters, which can no longer be produced with good yield because of long idle time during the drawing process. For special cases these amounts are still significant. Above 3 Mol % the crystallization can be scarcely controlled, so that the use of a glass containing these amounts of $La_2O_3$ for fiber applications must be avoided. Furthermore $La_2O_3$ is very reactive toward $SiO_2$-containing fire-resistant materials. For these reasons the use of the maximum 3 Mol % of $La_2O_3$ remains limited, in order to be able to manufacture with standard melt vessels.

$La_2O_3$ can be replaced by equivalent amounts of $Gd_2O_3$ and $Lu_2O_3$ according to the art. However since these oxides are expensive and not very pure, this is usually avoided. $Y_2O_3$ has a smaller index of refraction increment and a higher cost and thus is not used. In this case the use of small amounts to suppress crystallization appears to be ineffective so that as a result there is no reason to use $Y_2O_3$. The same is true for $Sc_2O_3$.

$ZrO_2$ and $HfO_2$ are two essential ingredients for producing a high index of refraction and good chemical resistance. A minimum amount of 0.02 Mol % of $HfO_2$ is required, since $HfO_2$ counteracts the tendency of the glass to crystallize. A minimum content of 2.02 Mol % for the sum of the amounts of $ZrO_2$ and $HfO_2$ is required to obtain a high index of refraction. However if the maximum amount of the sum of these oxides exceeds 5 Mol %, the meltability decreases and the tendency to crystallize increases. Considering these limitations regarding the sum of these two oxides the glass should contain from 2 to 5 Mol % of $ZrO_2$ and from 0.02 to 5 Mol % of $HfO_2$, preferably from 2 to 4.08 Mol % of $ZrO_2$ and from 0.02 to 4.1 Mol % $HfO_2$. Thus it is surprising that a positive effect on the tendency to crystallize starts to appear in spite of the small content of $HfO_2$. Price and purity of $HfO_2$ are generally currently still not competitive with the price and purity of $ZrO_2$, so that $HfO_2$ is seldom used in amounts over 1 Mol % for purely pragmatic reasons. Generally the $HfO_2$ content is less than 0.3 Mol %.

Furthermore it has been shown that a minimum amount of the sum of $SiO_2+ZrO_2+HfO_2$ is required to obtain a good acid resistance. The sum of $SiO_2+ZrO_2+HfO_2$ should be at least 58.8 Mol %, preferably at least 59 Mol %.

The best acid classes 1.x are only obtained in exceptional cases when the sum of $SiO_2+ZrO_2+HfO_2$ is below 58.8 Mol %. In the range between 58.8 Mol % and 59 Mol % acid class 1 predominates with a few cases of acid class 2 and in the range greater than 59 Mol % glass of acid class 1 is produced. However even in the range greater than 59 Mol % but near 59 Mol % glass of acid glass 1.0 is still not produced, but instead the subclasses 1.1, 1.2, and 1.3 result. Although these acid classes exhibit no removal from the glass surface, they still have optical variations of the glass surface (interference colors).

Further the glass contains 0-3 Mol % $Nb_2O_5$ and $Ta_2O_5$. Both oxides can be used in a similar manner for adjustment of the optical properties ($n_d$-$\upsilon_d$). However both oxides, especially $Ta_2O_5$, are more expensive than the other high index-of-refraction oxides ($ZrO_2$, $La_2O_3$, $HfO_2$), so that whether it is better to obtain the $n_d$ by using the other oxides should be carefully considered. Especially in the case of $Nb_2O_5$ it should be considered that the current purity of $Nb_2O_5$ is not satisfactory and also boundary surface effects increasing damping occur with some of the cladding glasses. For these reasons the glass preferably contains no $Nb_2O_5$.

In cases in which the refining is not free of refining agents, a refining with $As_2O_3$ and/or $Sb_2O_3$ is preferred in amounts of up to 0.5 Mol %. Preferably $As_2O_3$ is used, since it provides better attenuation results than $Sb_2O_3$ at the blue edge. However it is has been shown that glass refined with $Sb_2O_3$ has better solarization properties than a glass refined with $As_2O_3$. If there is special value associated with solarization resistance of the glass, then it is preferable to refine using $Sb_2O_3$ and to keep the $AS_2O_3$ as small as possible. The glass raw material should then be as free of $As_2O_3$ as possible. The $As_2O_3$ content should not exceed 500 ppm, preferably 100 ppm, especially 50 ppm (Molar basis). An amount of 0.05 to 0.4 Mol %, especially 0.1 to 0.2 Mol %, $Sb_2O_3$ is preferred to increase solarization resistance. Sulfates and chlorides should be avoided as refining agents, since the attenuation is somewhat negatively effected.

The content of colored impurities, such as $Fe_2O_3$, $Cr_2O_3$, NiO, CuO, colored d-elements and rare earth oxides should be as low as possible. An upper limit for the sum of these colored impurities of <10 ppm, preferably <1 ppm, should not be exceeded.

Furthermore it has been shown that the solarization stability of the glass can be further improved by addition of small amounts of $WO_3$, $Bi_2O_3$ and/or $TiO_2$. Generally these oxides exert a negative influence on the attenuation. When these oxides are added to improve solarization, $Bi_2O_3$ and $TiO_2$ should each only be present in the glass in amounts of from 0.05 to 0.5 Mol %. On account of its high coloring power $WO_3$ should only be used in amounts of 0.05 to 0.35 Mol %. The preferred amount of each of these oxides is from 0.1 to 0.3 Mol %. The oxides $Bi_2O_3$, $WO_3$ and $TiO_2$ can each be used alone but they can also use in combination with each other. A combination of one or more of these oxides with 0.2 to 2 Mol % of $B_2O_3$ exerts an especially positive influence on the solarization stability. The combination of 1 Mol % $B_2O_3$ with 0.3 Mol % $TiO_2$ has proven to be especially good.

Besides the requirement for small attenuation a requirement for as neutral as possible a color temperature exists. The longer fibers made from these glasses frequently have a yellow tint because of Fe, Cr, and Ni impurities in the glass batch used to make the core glass as well as Pt impurities occurring because of the melting process. For this reason it can be important to add small amounts of CoO to the glass so that it is a neutral color glass. The amounts of CoO to be used are 3 to 100 ppb, preferably 5 to 50 ppb. The color temperatures increase to values up to over 5700 K (Standard light D65, 3.8 m length).

EXAMPLE

To make the core glass a batch of commercially obtained raw materials were placed in a platinum heated crucible with a silica glass crucible insert heated inductively at 1420° C. for a time interval of about 5 h. The outer temperature of the platinum crucible was measured with a thermocouple. Heat is lost through the silica glass crucible so that the pyrometrically measured glass temperature can up to 80° C. less than that of the melt phase. After that a standing stage of about 0.75 h occurs, during which the final melt remnants dissolve and refining occurs. After that a stirring stage occurs for about 15 min for gross homogenization (silica glass stirrer). A fine refining is performed at 1460° C. for 15 min. After that the glass melt is stirred at 1320° C. and cast or molded to form the desired glass product. This glass product is inserted in a laboratory cooling oven and cooled at a rate of 10 K/h to room temperature.

The results are summarized or tabulated in Table I. The glass compositions are given in Mol % on an oxide basis. The symbols for the properties have the following meanings: $n_d$ represents the index of refraction; $\upsilon_d$ represents the Abbe number; α represents the linear thermal expansion coefficient in a temperature range between 20° C. and 300° C. according to ISO 7991; Tg represents the glass transformation temperature according to ISO 7884; ρ represents the density measured according to the buoyancy flotation method according to Archimedes principle; Ew represents the glass softening temperature (glass viscosity of $10^{7.6}$ dPa*s), $V_A$ represents the processing temperature (glass viscosity of $10^4$ dPa*s); and CR is the climate resistance class according to ISO/WD 13384.

FR represents the stain or spot resistance. A polished plate is brought into contact with a standard acetate buffer solution with a pH of 4.6 at 25° C. to measure the stain resistance. A stain is detected by its blue-brown interference color (which corresponds to a layer thickness for the stain of 0.1 μm). The stain resistance is classified as follows:

Class 0: no stain after 100 hours of treatment,
Class 1: a stain observed after 100 hours of treatment,
Class 2: a stain observed after 6 hours of treatment, and
Class 3: a stain observed after 1 hour of treatment.

SR represents the acid resistance class according to ISO 8424.

AR represents the alkali resistance class according to ISO 9689.

OEG (T) represents the upper devitrification temperature in ° C.

OEG (lg η) represents the common logarithm of the viscosity at the upper devitrification temperature.

TABLE I

EXEMPLARY CORE GLASS COMPOSITIONS, in Mol %

| Oxide | Example No: | | | | | | |
|---|---|---|---|---|---|---|---|
| | 1 | 2 | 3 | 4 | 5 | 6 | 7 |
| $SiO_2$ | 59.73 | 59.32 | 59.67 | 59.68 | 58.51 | 58.96 | 56.77 |
| $Li_2O$ | 2.01 | 1.99 | 1.99 | 1.99 | 2.04 | 1.95 | 1.97 |
| $Na_2O$ | 7.76 | 7.72 | 7.75 | 7.82 | 7.98 | 8.13 | 7.95 |
| $K_2O$ | 4.83 | 5.16 | 5.14 | 5.08 | 5.04 | 5.19 | 4.94 |
| BaO | 0.78 | 0.42 | 0.48 | 0.43 | 0.42 | 0.49 | 0.42 |
| ZnO | 20.74 | 21.04 | 20.72 | 20.73 | 20.56 | 20.82 | 24.36 |
| $La_2O_3$ | 2.10 | 2.12 | 2.12 | 2.12 | 2.12 | 0.54 | 1.24 |
| $ZrO_2$ | 1.93 | 2.11 | 2.11 | 2.12 | 2.13 | 3.88 | 2.22 |
| $HfO_2$ | 0.02 | 0.02 | 0.02 | 0.02 | 0.02 | 0.04 | 0.02 |
| $As_2O_3$ | 0.12 | 0.12 | — | 0.04 | 0.12 | 0.04 | 0.12 |
| $\Sigma SiO_2 + ZrO_2 + HfO_2$ | 61.68 | 61.45 | 61.80 | 61.82 | 60.66 | 62.88 | 59.01 |
| $B_2O_3$ | — | — | — | — | 1.08 | — | — |
| $Al_2O_3$ | — | — | — | — | — | — | — |
| $Nb_2O_5$ | — | — | — | — | — | — | — |
| $Ta_2O_5$ | — | — | — | — | — | — | — |

TABLE I-continued

EXEMPLARY CORE GLASS COMPOSITIONS, in Mol %

| | | | | | | | | |
|---|---|---|---|---|---|---|---|---|
| $Sb_2O_3$ | — | — | 0.04 | — | — | — | — | |
| $n_d$ | 1.58617 | 1.58698 | 1.58647 | 1.58628 | 1.58633 | 1.58216 | 1.58825 | |
| $v_d$ | 51.87 | 51.68 | 51.62 | 51.83 | 52.37 | 51.27 | 51.06 | |
| $\alpha\,[10^{-6}\,K^{-1}]$ | 8.78 | 8.82 | 8.83 | — | 8.82 | 8.62 | 8.74 | |
| $\rho\,[g/cm^3]$ | 3.1205 | 3.1209 | 3.1174 | — | — | 3.0439 | 3.1330 | |
| Tg | 536 | 547 | 539 | — | 527 | 546 | 534 | |
| $E_w$ | 704 | — | — | — | 693 | ■ | — | |
| $V_A$ | 947 | — | — | — | 933 | 974 | 931 | |
| CR | 1 | 1 | 1 | — | — | 1 | 1 | |
| FR | 0 | 1 | 1 | — | 0 | 0 | 0 | |
| SR | 1.0 | 1.0 | 1.0 | — | 1.0 | 1.0 | 1.2 | |
| AR | 1.0 | 1.0 | 1.0 | — | 1.0 | 1.0 | 1.0 | |
| OEG (T) | 1055 | — | 1045 | — | 1005 | 1100 | 1025 | |
| OEG (lg η) | 3.10 | — | — | — | 3.37 | 2.99 | 3.18 | |

| | Example No: | | | | | | | |
|---|---|---|---|---|---|---|---|---|
| Oxide | 8 | 9 | 10 | 11 | 12 | 13 | 14 | 15 |
| $SiO_2$ | 55.45 | 58.47 | 54.65 | 55.60 | 56.25 | 55.62 | 55.39 | 55.89 |
| $Li_2O$ | 0.97 | 1.96 | 2.09 | 2.04 | 1.88 | 1.75 | 1.98 | 1.93 |
| $Na_2O$ | 6.99 | 7.25 | 7.68 | 7.63 | 7.39 | 6.97 | 6.58 | 6.62 |
| $K_2O$ | 3.08 | 2.98 | 3.22 | 3.06 | 3.01 | 3.07 | 3.05 | 3.09 |
| BaO | 5.77 | 4.5 | 4.87 | 4.75 | 4.74 | 4.71 | 4.70 | 4.66 |
| ZnO | 21.56 | 19.22 | 21.39 | 20.97 | 20.57 | 21.36 | 21.27 | 21.65 |
| $La_2O_3$ | 2.67 | 2.46 | 2.67 | 2.63 | 2.59 | 2.68 | 2.62 | 2.64 |
| $ZrO_2$ | 3.40 | 0.03 | 0.03 | 1.61 | 3.14 | 3.67 | 3.27 | 3.40 |
| $HfO_2$ | 0.04 | 3.01 | 3.28 | 1.60 | 0.23 | 0.05 | 0.04 | 0.04 |
| $As_2O_3$ | 0.12 | 0.12 | 0.12 | 0.12 | 0.12 | 0.12 | 0.12 | 0.12 |
| $\Sigma SiO_2 + ZrO_2 + HfO_2$ | 58.89 | 61.51 | 57.96 | 58.81 | 59.62 | 59.34 | 58.69 | 59.24 |
| $B_2O_3$ | — | — | — | — | — | — | — | — |
| $Al_2O_3$ | — | — | — | — | — | — | — | — |
| $Nb_2O_5$ | — | — | — | — | — | — | — | — |
| $Ta_2O_5$ | — | — | — | — | — | — | — | — |
| $Sb_2O_3$ | — | — | — | — | — | — | 1.00 | — |
| $n_d$ | 1.62468 | 1.60984 | 1.62384 | 1.62265 | 1.62361 | 1.62353 | 1.61929 | 1.62122 |
| $v_d$ | 49.92 | 51.68 | 50.44 | 50.26 | 49.94 | 49.94 | — | 50.14 |
| $\alpha\,[10^{-6}\,K^{-1}]$ | 8.17 | 7.99 | 8.38 | 8.33 | 8.22 | 8.14 | 8.12 | 8.14 |
| $\rho\,[g/cm^3]$ | 3.4681 | 3.4598 | 3.5787 | 3.4496 | 3.4392 | 3.4293 | 3.378 | 3.3992 |
| Tg | 588 | 566 | 566 | 570 | 563 | 565 | 555 | 567 |
| $E_w$ | 738 | 738 | 723 | 724 | 726 | 730 | 716 | 725 |
| $V_A$ | 955 | 977 | 942 | 945 | 946 | 950 | 936 | 947 |
| CR | — | 1 | — | — | — | 1 | 1 | 1 |
| FR | — | 0 | — | — | — | 0 | 0 | 0 |
| SR | — | 1.0 | — | — | — | 1.0 | 1.0 | 1.0 |
| AR | — | 1.0 | — | — | — | 1.0 | 1.0 | 1.0 |
| OEG (T) | 1125 | 965 | 1045 | 1050 | 1145 | 1180 | 1005 | 1075 |
| OEG (lg η) | 2.5 | 4.12 | 3.03 | 3.01 | 2.34 | 2.12 | 3.32 | 2.86 |

The manufacture of optical step index fibers from a multi-component glass occurs either by the so-called double crucible method or the rod-tube method. In the case of both methods the core glass and the cladding glass are heated to temperatures, which correspond to a viscosity range between $10^4$ and $10^3$, and are drawn to form a fiber. So that a stable fiber with low attenuation can be produced, the core and cladding glass must have properties, such as viscosity behavior, thermal expansion, crystallization tendency, among others, such that they are compatible with each other. Particularly reactions, such as diffusion and crystallization, cannot occur between the core glass and the cladding glass at the boundary surfaces between the core and the cladding, which interfere with a total reflection of the light in the fiber core and increase the attenuation. Moreover the mechanical strength of the fiber must not be negatively affected by crystallization.

The cladding glass comprises a silicate glass, which has an index of refraction, which is at least 2% less than that of the core glass and a viscosity, which is preferably equal to or higher than the viscosity of the core glass, at the temperature at which the fiber is drawn. The higher viscosity of the cladding glass in comparison to that of the core glass improves the stability of the drawing process. Furthermore the linear thermal expansion coefficient α of the cladding glass should be equal to or especially at least about $2\times10^{-6}\,K^{-1}$ smaller than that of the core glass. The fiber cladding experiences a pre-stressing, which increases the mechanical stability of the fiber, because of its smaller thermal expansion coefficient. However the pre-stressing may not be so large that problems occur with the fiber production. That is usually avoided when the difference between the thermal expansion coefficients is under about $5\text{-}6\times10^{-6}\,K^{-1}$.

The index of refraction of the cladding glass $n_d$ should be less than 1.5, so that the fiber has a large numerical aperture NA. Glass with a higher index of refraction should only be used for the cladding glass if a smaller aperture NA is desired.

Furthermore the cladding glass preferably melts at a higher temperature than the core glass so that the fiber can be satisfactorily drawn and processed, as experiments have shown. This is especially true when the fibers are bundled to make a light guide and melted under radial pressure.

For economic reasons the known and available types of tubular glass are used for the cladding glass and the types of core glass are adjusted to fit the cladding glass, so that no crystallization or other devitrification effects occur at the core-cladding boundary surface.

The relevant tubular glasses may be divided into three groups, to which different representatives belong, according to their index of refraction, viscosity position, thermal expansion properties and availability.

Glasses of group 1 include the so-called neutral glasses, such as those used as primary packaging agents in the pharmaceutical industry (e.g. SCHOTT Glass 8800 or 8412). These $Li_2O$-free borosilicate glasses are preferred as cladding glasses for the above-described step index fibers. They are especially well suited as the core glass because their thermal expansion coefficient is in a range of about 5 ppm/K. The low index of refraction value of about 1.49 permits a high aperture angle and aperture NA of the fiber.

Glasses of group 2 include $Li_2O$-containing borosilicate glass with a high $B_2O_3$ content over 15%. KOVAR® glasses (e.g. SCHOTT 8242, 8245, and 8250) and UV transmitting borosilicate glasses (SCHOTT 8337b) fall within this group.

Glasses of group 3 include borosilicate glasses of the standard DIN ISO 3585 ("Borosilicate glass 3.3"). However adjustment of these glasses is not optimal because of their low expansion coefficients of 3 to $4 \times 10^{-6}$ $K^{-1}$. Also the mechanical strength of the fiber is less than that of the cladding glasses of group 2, since crystallization occurs at the boundary surface between core and cladding glass.

The cladding glass compositions of the different cladding glass groups and their properties are tabulated or summarized in Table II. The cladding glass compositions are given in weight percent on an oxide basis.

optical fibers were made according to a known rod-tube drawing method with a conventional rod-tube drawing machine with a cylindrical oven according to the state of the art. Fiber optic light guides were made from the individual optical fibers. The optical fibers were glued together in a fiber bundle of a 2-3 mm diameter in an end sleeve and the optical end surfaces were prepared for input and output of light by grinding and polishing.

The attenuation of individual fibers of diameter 70 µm was measured according to DIN 58141, Part 1 (cut-back method). Furthermore the average loop breaking diameter was measured, which reflects the basic strength of the fiber. The loop breaking diameter is measured, when the fiber is arranged in a loop, whose diameter is slowly reduced until it reaches the breaking point, which corresponds to the loop breaking diameter.

The spectral transmissions of test samples of the light guide with sample lengths of 1 m and 3.8 mm were measured according to the method described in DIN 58141, Part 2. The numerical aperture was also measured for a sample of length 1 m at 550 nm according to the method described in DIN 58141, Part 3.

The color temperature of the light issuing from the fiber after passing through a certain fiber length was measured in relation to a standard light source D65 (color temperature 6504 K) as a measure of the yellow tint or yellowness of the fiber. The more the color temperature deviates from the color temperature of the standard light source D65, the greater is the yellow cast or tint.

The results are tabulated or summarized in Table III, "OPTICAL FIBER PROPERTIES I-NA RANGE about 0.54" and in Table IV

TABLE II

| CLADDING GLASS COMPOSITIONS in Weight % on an oxide basis | | | | | | | | | |
|---|---|---|---|---|---|---|---|---|---|
| | Group 1 | | | Group 2 | | | | Group 3 | |
| | Range | Ex. 1a | Ex. 1b | Range | Ex. 2a | Ex. 2b | Ex. 2c | Range | Ex. 3a |
| Oxide | | | | | | | | | |
| $SiO_2$ | 70-78 | 75.1 | 73.9 | 62-70 | 68.0 | 68.5 | 67.1 | 75-85 | 80.6 |
| $Al_2O_3$ | 5-10 | 5.2 | 6.6 | 0-10 | 5.6 | 2.7 | 5.0 | 1-5 | 2.4 |
| $B_2O_3$ | 5-14 | 10.5 | 9.6 | >15 | 18.5 | 19.0 | 20.8 | 10-14 | 12.7 |
| $Li_2O$ | — | — | — | >0.1 | 0.5 | 0.7 | 0.7 | — | — |
| $Na_2O$ | 0-10 | 7 | 6.6 | 0-10 | 6.9 | 0.7 | 2.5 | 2-8 | 3.5 |
| $K_2O$ | 0-10 | 0.2 | 2.6 | 0-10 | — | 7.6 | 1.6 | 0-1 | 0.6 |
| MgO | 0-1 | — | 0.01 | 0-5 | — | — | — | — | — |
| CaO | 0-2 | 1.5 | 0.7 | 0-5 | — | — | 0.6 | — | — |
| SrO | 0-1 | — | — | 0-5 | — | — | — | — | — |
| BaO | 0-3 | 0.6 | 0.04 | 0-5 | — | — | 1.3 | — | — |
| ZnO | — | — | — | 0-5 | 1.0 | 0.6 | — | — | — |
| F | 0-1 | 0.2 | — | 0-1 | — | — | 0.8 | — | — |
| Physical and Chemical Properties | | | | | | | | | |
| $n_d$ | — | 1.492 | 1.488 | — | 1.488 | 1.487 | 1.476 | — | 1.473 |
| $\alpha$ $[10^{-6} K^{-1}]$ | — | 4.9 | 5.5 | — | 5.1 | 5.0 | 4.2 | — | 3.3 |
| $\rho$ $[g/cm^3]$ | — | 2.34 | 2.34 | — | 2.31 | 2.28 | 2.21 | — | 2.23 |
| W | — | 1 | 1 | — | 3 | 3 | 3 | — | 1 |
| S | — | 1 | 1 | — | 4 | 4 | 4 | — | 1 |
| L | — | 2 | 2 | — | 3 | 3 | 3 | — | 2 |

The following is a list of the symbols in Table II and their meaning:
'Ex.' represents 'Example'
α denotes the thermal expansion coefficient in a temperature range of 20° C. to 300° C.
ρ denotes the density n [g/cm³]
W denotes the hydrolytic resistance according to DIN ISO 720
S denotes the acid resistance according to DIN 12116
L denotes the alkali resistance according to DIN ISO 695.

Optical fibers with diameters of 30, 50, and 70 µm were made from selected core glasses from Table I, which were combined with selected cladding glasses from Table II. The physical properties of these optical fibers were measured. The "OPTICAL FIBER PROPERTIES II-NA-RANGE about 0.64". Comparative data for lead-containing types of optical fiber with comparable numerical apertures of 0.54 and of 0.64 are given for comparison. The comparative data includes data for a platinum-free lead-containing glass that was produced without an attenuation increasing Pt influence and a platinum-containing glass, which was produced in a platinum-containing melt vessel.

It is apparent from the examples in these tables of the lead-free fibers nos. F3 to F5 with an NA-range of 0.54 that the lead-free fibers according to the present invention are equally as good as the current multi-usage fibers F1 and F2 of the prior art in regard to attenuation, transmission, and aperture angle, both in the case of the platinum-free glass and the platinum-containing glass. The optical properties were obtained for the lead-free core glass according to example 4 of table I with both a cladding glass of group I (F3) and also a cladding glass of group II (F5). However it has been shown that optimum fibers cannot be produced in every case by combining this new core glass of example 4 according to the invention with a respective cladding glass of group 2. For example, the optical fiber made by combining the core glass of example 4 with the cladding glass 2c according to table 11 does not have optimum optical properties.

The examples F9 and F10 of the lead-free optical fiber with an NA-range of 0.64 have similar optical properties as the lead-containing optical fibers F7 and F8. If e.g. the quality of the glasses F10 and F7 from the platinum-containing melt vessel are compared, it is apparent that the lead-free optical fiber F10 has similar transmission values and aperture angle as the lead-containing optical fiber F7. The color temperature of the lead-free optical fiber sample with a 3.8 m length, namely 5501 K, is about 50 K below that of the lead-containing optical fiber, namely 5546 K. The color temperature can be definitely increased by a small amount of cobalt dopant, which increases the attenuation at about 500 nm, as can be seen from example F12. The transmission drop to be expected in this case is accepted because of a smaller color tint.

From example F12 it is also apparent that the high index of refraction core glasses according to the invention are compatible with cladding glasses of group 2. Example F11 shows that the color temperature D65 can be increased even over the optimum value of 6504 K by an appropriately large amount of Co dopant.

TABLE III

OPTICAL FIBER PROPERTIES I - NA-RANGE about 0.54 (Fiber diameter 70 μm)

| | Fiber Type No: | | | | | |
|---|---|---|---|---|---|---|
| | F1 | F2 | F3 | F4 | F5 | F6 |
| Category | Lead-containing fiber | Lead-containing fiber, Pt-free quality | Lead-free fiber with Group 1 Cladding glass | Lead-free fiber, PT-free, with Group 1 Cladding glass | Lead-free fiber with Group 2 Cladding glass | Lead-free fiber with Group 2 Cladding glass, Counter example |
| Core glass from Tab. I Example No: | Lead silicate $n_d = 1.582$ | Lead silicate $n_d = 1.582$ | 4 | 4 | 4 | 4 |
| Core glass from Tab. II Example No.: | 2b | 2b | 1b | 1b | 2b | 2c |
| Theoretical NA | 0.54 | 0.54 | 0.54 | 0.54 | 0.55 | 0.58 |
| NA, measured at 550 nm fur 1 m length | 0.55 | 0.53 | — | 0.54 | 0.52 | — |
| Fiber attenuation, 70 μm | | | | | | |
| ... at 400 nm [dB/km] | 607 | 328 | 423 | 290 | 298 | 1937 |
| ... at 450 nm [dB/km] | 423 | 244 | 351 | 230 | 280 | 2079 |
| ... at 550 nm [dB/km] | 205 | 128 | 131 | 124 | 118 | 1571 |
| ... at 650 nm [dB/km] | 259 | 142 | 147 | 122 | 143 | 1280 |
| Transmission, 70 μm, length 1 m | | | | | | |
| ... at 458 nm [%] | 55 | 59.7 | 62.3 | 59.4 | 58.2 | — |
| ... at 553 nm [%] | 58 | 62.0 | 65.8 | 61.1 | 60.6 | — |
| ... at 654 nm [%] | 58 | 61.9 | 65.8 | 61 | 60.6 | — |
| Color temperature D65 fur sample length 1 m [K] | 6230 | 6355 | 6205 | 6491 | 6357 | — |
| Breaking loop diameter, 70 μm [mm] | 1.9 | 1.8 | 2.0 | 2.2 | 1.7 | 2.2 |

TABLE IV

OPTICAL FIBER PROPERTIES II - NA-RANGE about 0.64 (Fiber diameter 70 μm)

| | Fiber type No: | | | | | |
|---|---|---|---|---|---|---|
| | F7 | F8 | F9 | F10 | F11 | F12 |
| Category | Lead-containing fiber with Pt-Influence, NA 0.64 | Lead-containing fiber, Pt-free quality, NA 0.64 | Lead-free fiber, Pt-free | Lead-free fiber with Pt-Influence | Lead-free fiber with Pt-Influence and co-doping | Lead-free fiber with group 2 cladding glass, Pt-free |

TABLE IV-continued

OPTICAL FIBER PROPERTIES II - NA-RANGE about 0.64 (Fiber diameter 70 μm)

| | Fiber type No: | | | | | |
|---|---|---|---|---|---|---|
| | F7 | F8 | F9 | F10 | F11 | F12 |
| Core glass from Tab. I Example No: | Lead silicate $n_d = 1.620$ | Lead silicate $n_d = 1.620$ | 15 | 15 | 15 | 15 |
| Core glass from Tab. II Example No.: | Group 2 | Group 2 | 1b | 1b | 1b | 2b |
| Theoretical NA | 0.64 | 0.64 | 0.64 | 0.64 | 0.64 | 0.64 |
| NA, measured at 550 nm fur 1 m length | 0.64 | 0.61 | 0.64 | 0.63 | — | 0.63 |
| Fiber attenuation, 70 μm | | | | | | |
| ... at 400 nm [dB/km] | 944 | 724 | 420 | 714 | 690 | 468 |
| ... at 450 nm [dB/km] | 595 | 372 | 316 | 566 | 600 | 366 |
| ... at 550 nm [dB/km] | 237 | 169 | 144 | 213 | 519 | 198 |
| ... at 650 nm [dB/km] | 236 | 140 | 133 | 242 | 712 | 185 |
| Transmission, 70 μm, length 1 m | | | | | | |
| ... at 458 nm [%] | 60.7 | 59 | 58.9 | 60.7 | — | 59.1 |
| ... at 553 nm [%] | 64.9 | 62.0 | 61.6 | 66.2 | — | 61.8 |
| ... at 654 nm [%] | 65.3 | 63.0 | 61.8 | 65.9 | — | 61.9 |
| Color temperature D65 fur sample length 1 m [K] | 5546 | 5714 | 5855 | 5501 | 6797 | 5854 |
| Breaking loop diameter, 70 μm [mm] | 2.1 | 2.0 | 1.7 | 1.9 | — | 1.7 |

While the invention has been illustrated and described as embodied in a core glass in the alkali-zinc-silicate glass system for a fiber-optic light guide and a fiber-optic light guide made from this core glass, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A core glass in the alkali-zinc-silicate system for a step index fiber, which contains, in Mol % on an oxide basis:

| | |
|---|---|
| $SiO_2$ | 54.5-65 |
| ZnO | 18.5-30 |
| Σ alkali metal oxides | 8-20 |
| $La_2O_3$ | 0.5-3 |
| $ZrO_2$ | 2-5 |
| $HfO_2$ | 0.02-5 |
| $Σ ZrO_2 + HfO_2$ | 2.02-5 |
| $TiO_2$ | 0-0.5 |
| BaO | 0.4-6 |
| SrO | 0-6 |
| MgO | 0-2 |
| CaO | 0-2 |
| Σ alkaline earth metal oxides | 0.4-6 |
| $Li_2O$ | 0.5-3 |
| $Σ SiO_2 + ZrO_2 + HfO_2$ | >58.5; | wherein a molar ratio of ZnO:Σ alkaline earth metal oxides >3.5:1, but with the proviso that the core glass contains said $Li_2O$ in an amount that is not more than 25% of a sum total amount, in Mol % on said oxide basis, of said alkali metal oxides present in the core glass.

2. The core glass as defined in claim 1, containing from 2 to 4.08 Mol % of said $ZrO_2$, from 0.02 to 3.3 Mol % of said $HfO_2$, and from 2.02 to 4.1 Mol % of said $Σ ZrO_2+HfO_2$.

3. A core glass in the alkali-zinc-silicate system for a step index fiber, as defined in claim 1 and which contains, in Mol % on an oxide basis:

| | |
|---|---|
| $SiO_2$ | 55-61 |
| ZnO | 20-25 |
| Σ alkali metal oxides | 11-16 |
| $La_2O_3$ | 1.5-2.9 |
| $ZrO_2$ | 2-4.08 |
| $HfO_2$ | 0.02-3.3 |
| $Σ ZrO_2 + HfO_2$ | 2.02-4.1 |
| $TiO_2$ | 0-0.5 |
| BaO | 0.4-5 |
| SrO | 0.4-5 |
| Σ alkaline earth metal oxides | 0.4-5 |
| $Li_2O$ | 1-2.5 |
| $Σ SiO_2 + ZrO_2 + HfO_2$ | >59. |

4. The core glass as defined in claim 1, wherein said alkali metal oxides comprise $Na_2O$ and $K_2O$ and a molar ratio of said $Na_2O$ to said $K_2O$ is from 1:1.1 to 1:0.3.

5. The core glass as defined in claim 1, wherein said alkali metal oxides comprise $Na_2O$ and $K_2O$ and a molar ratio of said $Na_2O$ to said $K_2O$ is from 1:0.95 to 1:0.4.

6. The core glass as defined in claim 1, wherein said molar ratio of said ZnO:said Σ alkaline earth metal oxides >4:1.

7. The core glass as defined in claim 1, containing from 0 to 5 Mol % of $B_2O_3$ and/or from 0 to 0.5 Mol % of $P_2O_5$, from 0 to 5 Mol % of $GeO_2$ and/or from 0 to 6 Mol % of $Rb_2O$ and/or from 0 to 6 Mol % of $Cs_2O$.

8. The core glass as defined in claim 1, containing from 0.2 to 2 Mol % of said $B_2O_3$.

9. The core glass as defined in claim 1, containing from 0.05 to 0.4 Mol % of $Sb_2O_3$.

10. The core glass as defined in claim 9, containing from 0.1 to 0.2 Mol % of said $Sb_2O_3$.

11. The core glass as defined in claim 1, containing from 0.05 to 0.5 Mol % of $Bi_2O_3$ and/or from 0.05 to 0.5 Mol % of $TiO_2$ and/or from 0.05 to 0.35 Mol % of $WO_3$.

12. The core glass as defined in claim 11, containing from 0.1 to 0.3 Mol % of said $Bi_2O_3$ and/or from 0.1 to 0.4 Mol % of said $TiO_2$ and/or from 0.1 to 0.3 Mol % of said $WO_3$.

13. The core glass as defined in claim 3, wherein said alkali metal oxides comprise $Na_2O$ and $K_2O$ and a molar ratio of said $Na_2O$ to said $K_2O$ is from 1:1.1 to 1:0.3.

14. The core glass as defined in claim 3, wherein said alkali metal oxides comprise $Na_2O$ and $K_2O$ and a molar ratio of said $Na_2O$ to said $K_2O$ is from 1:0.95 to 1:0.4.

15. The core glass as defined in claim 3, wherein said molar ratio of said ZnO:said Σ alkaline earth metal oxides >4:1.

16. The core glass as defined in claim 3, containing from 0 to 5 Mol % of $B_2O_3$ and/or from 0 to 0.5 Mol % of $P_2O_5$, from 0 to 5 Mol % of $GeO_2$ and/or from 0 to 6 Mol % of $Rb_2O$ and/or from 0 to 6 Mol % of $Cs_2O$.

17. The core glass as defined in claim 3, containing from 0.2 to 2 Mol % of said $B_2O_3$.

18. The core glass as defined in claim 3, containing from 0.05 to 0.4 Mol % of $Sb_2O_3$.

19. The core glass as defined in claim 18, containing from 0.1 to 0.2 Mol % of said $Sb_2O_3$.

20. The core glass as defined in claim 3, containing from 0.05 to 0.5 Mol % of $Bi_2O_3$ and/or from 0.05 to 0.5 Mol % of $TiO_2$ and/or from 0.05 to 0.35 Mol % of $WO_3$.

21. The core glass as defined in claim 20, containing from 0.1 to 0.3 Mol % of said $Bi_2O_3$ and/or from 0.1 to 0.4 Mol % of said $TiO_2$ and/or from 0.1 to 0.3 Mol % of said $WO_3$.

22. A step index fiber comprising a core and a cladding, wherein the core comprises a core glass and said core glass contains, in Mol % on an oxide basis:

| | |
|---|---|
| $SiO_2$ | 54.5-65 |
| ZnO | 18.5-30 |
| Σ alkali metal oxides | 8-20 |
| $La_2O_3$ | 0.5-3 |
| $ZrO_2$ | 2-5 |
| $HfO_2$ | 0.02-5 |
| Σ $ZrO_2$ + $HfO_2$ | 2.02-5 |
| $TiO_2$ | 0-0.5 |
| BaO | 0.4-6 |
| SrO | 0-6 |
| MgO | 0-2 |
| CaO | 0-2 |
| Σ alkaline earth metal oxides | 0.4-6 |
| $Li_2O$ | 0.5-3 |
| Σ $SiO_2$ + $ZrO_2$ + $HfO_2$ | >58.5; | wherein a molar ratio of ZnO:Σ alkaline earth metal oxides >3.5:1, but with the proviso that said core glass contains said $Li_2O$ in an amount that is not more than 25% of a sum total amount, in Mol % on said oxide basis, of said alkali metal oxides present in said core glass.

23. A step index fiber comprising a core and a cladding, wherein the core comprises a core glass and said core glass contains, in Mol % on an oxide basis:

| | |
|---|---|
| $SiO_2$ | 54.5-65 |
| ZnO | 18.5-30 |
| Σ alkali metal oxides | 8-20 |
| $La_2O_3$ | 0.5-3 |
| $ZrO_2$ | 2-5 |
| $HfO_2$ | 0.02-5 |
| Σ $ZrO_2$ + $HfO_2$ | 2.02-5 |
| BaO | 0.4-6 |
| SrO | 0-6 |
| MgO | 0-2 |
| CaO | 0-2 |
| Σ alkaline earth metal oxides | 0.4-6 |
| $Li_2O$ | 0.5-3, but not more than 25% of a sum total amount, in Mol % on said oxide basis, of said alkali metal oxides. |
| Σ $SiO_2$ + $ZrO_2$ + $HfO_2$ | >58.5; | wherein a molar ratio of ZnO:Σ alkaline earth metal oxides >3.5:1; and
wherein the cladding comprises a cladding glass and the cladding glass contains, in Mol % on an oxide basis:

| | |
|---|---|
| $SiO_2$ | 70-78 |
| $Al_2O_3$ | 0-10 |
| $B_2O_3$ | 5-14 |
| $Li_2O$ | 0 |
| $Na_2O$ | 0-10 |
| $K_2O$ | 0-10 |
| MgO | 0-1 |
| CaO | 0-2 |
| SrO | 0-1 |
| BaO | 0-3 |
| F | 0-1. |

24. A step index fiber comprising core and a cladding, wherein the core comprises a core glass and said core glass contains, in Mol % on an oxide basis:

| | |
|---|---|
| $SiO_2$ | 54.5-65 |
| ZnO | 18.5-30 |
| Σ alkali metal oxides | 8-20 |
| $La_2O_3$ | 0.5-3 |
| $ZrO_2$ | 2-5 |
| $HfO_2$ | 0.02-5 |
| Σ $ZrO_2$ + $HfO_2$ | 2.02-5 |
| BaO | 0.4-6 |
| SrO | 0-6 |
| MgO | 0-2 |
| CaO | 0-2 |
| Σ alkaline earth metal oxides | 0.4-6 |
| $Li_2O$ | 0.5-3, but not more than 25% of a sum total amount, in Mol % on said oxide basis, of said alkali metal oxides. |
| Σ $SiO_2$ + $ZrO_2$ + $HfO_2$ | >58.5; | wherein a molar ratio of ZnO:Σ alkaline earth metal oxides >3.5:1, and
wherein the cladding comprises a cladding glass and the cladding glass contains, in Mol % on an oxide basis:

| | |
|---|---|
| $SiO_2$ | 62-70 |
| $B_2O_3$ | >15 |
| $Li_2O$ | >0.1 |
| $Na_2O$ | 0-10 |
| $K_2O$ | 0-10 |
| MgO | 0-5 |

| | |
|---|---|
| CaO | 0-5 |
| SrO | 0-5 |
| BaO | 0-5 |
| ZnO | 0-5 |
| F | 0-1. |

25. A step index fiber comprising core and a cladding, wherein the core comprises a core glass and said core glass contains, in Mol % on an oxide basis:

| | |
|---|---|
| $SiO_2$ | 54.5-65 |
| ZnO | 18.5-30 |
| Σ alkali metal oxides | 8-20 |
| $La_2O_3$ | 0.5-3 |
| $ZrO_2$ | 2-5 |
| $HfO_2$ | 0.02-5 |
| Σ $ZrO_2$ + $HfO_2$ | 2.02-5 |
| BaO | 0.4-6 |
| SrO | 0-6 |
| MgO | 0-2 |
| CaO | 0-2 |
| Σ alkaline earth metal oxides | 0.4-6 |
| $Li_2O$ | 0.5-3, but not more than 25% of a sum total amount, in Mol % on said oxide basis, of said alkali metal oxides. |
| Σ $SiO_2$ + $ZrO_2$ + $HfO_2$ | >58.5; | wherein a molar ratio of ZnO:Σ alkaline earth metal oxides >3.5:1, and wherein the cladding comprises a cladding glass and the cladding glass contains, in Mol % on an oxide basis:

| | |
|---|---|
| $SiO_2$ | 75-85 |
| $Al_2O_3$ | 1-5 |
| $B_2O_3$ | 10-14 |
| $Na_2O$ | 2-8 |
| $K_2O$ | 0-1. |

26. A step index fiber comprising a core and a cladding, wherein the core comprises a core glass and said core glass contains, in Mol % on an oxide basis:

| | |
|---|---|
| $SiO_2$ | 55-61 |
| ZnO | 20-25 |
| Σ alkali metal oxides | 11-16 |
| $La_2O_3$ | 1.5-2.9 |
| $ZrO_2$ | 2-4.08 |
| $HfO_2$ | 0.02-3.3 |
| Σ $ZrO_2$ + $HfO_2$ | 2.02-4.1 |
| $TiO_2$ | 0-0.5 |
| BaO | 0.4-5 |
| SrO | 0.4-5 |
| Σ alkaline earth metal oxides | 0.4-5 |
| $Li_2O$ | 1-2.5 |
| Σ $SiO_2$ + $ZrO_2$ + $HfO_2$ | >59; | wherein a molar ratio of ZnO:Σ alkaline earth metal oxides >3.5:1.

27. A step index fiber comprising core and a cladding, wherein the core comprises a core glass and said core glass contains, in Mol % on an oxide basis:

| | |
|---|---|
| $SiO_2$ | 55-61 |
| ZnO | 20-25 |
| Σ alkali metal oxides | 11-16 |
| $La_2O_3$ | 1.5-2.9 |
| $ZrO_2$ | 2-4.08 |
| $HfO_2$ | 0.02-3.3 |
| Σ $ZrO_2$ + $HfO_2$ | 2.02-4.1 |
| BaO | 0.4-5 |
| SrO | 0.4-5 |
| Σ alkaline earth metal oxides | 0.4-5 |
| $Li_2O$ | 1-2.5 |
| Σ $SiO_2$ + $ZrO_2$ + $HfO_2$ | >59; | wherein a molar ratio of ZnO:Σ alkaline earth metal oxides >3.5:1 and wherein the cladding comprises a cladding glass and the cladding glass contains, in Mol % on an oxide basis:

| | |
|---|---|
| $SiO_2$ | 70-78 |
| $Al_2O_3$ | 0-10 |
| $B_2O_3$ | 5-14 |
| $Li_2O$ | 0 |
| $Na_2O$ | 0-10 |
| $K_2O$ | 0-10 |
| MgO | 0-1 |
| CaO | 0-2 |
| SrO | 0-1 |
| BaO | 0-3 |
| F | 0-1. |

28. A step index fiber comprising a core and a cladding, wherein the core comprises a core glass and said core glass contains, in Mol % on an oxide basis:

| | |
|---|---|
| SiO2 | 55-61 |
| ZnO | 20-25 |
| Σ alkali metal oxides | 11-16 |
| $La_2O_3$ | 1.5-2.9 |
| $ZrO_2$ | 2-4.08 |
| $HfO_2$ | 0.02-3.3 |
| Σ $ZrO_2$ + $HfO_2$ | 2.02-4.1 |
| BaO | 0.4-5 |
| SrO | 0.4-5 |
| Σ alkaline earth metal oxides | 0.4-5 |
| $Li_2O$ | 1-2.5 |
| Σ $SiO_2$ + $ZrO_2$ + $HfO_2$ | >59; | wherein a molar ratio of ZnO:Σ alkaline earth metal oxides >3.5:1, and wherein the cladding comprises a cladding glass and the cladding glass contains, in Mol % on an oxide basis:

| | |
|---|---|
| $SiO_2$ | 62-70 |
| $B_2O_3$ | >15 |
| $Li_2O$ | >0.1 |
| $Na_2O$ | 0-10 |
| $K_2O$ | 0-10 |
| MgO | 0-5 |
| CaO | 0-5 |
| SrO | 0-5 |
| BaO | 0-5 |
| ZnO | 0-5 |
| F | 0-1. |

29. A step index fiber comprising a core and a cladding, wherein the core comprises a core glass and said core glass contains, in Mol % on an oxide basis:

| | |
|---|---|
| SiO$_2$ | 55-61 |
| ZnO | 20-25 |
| Σ alkali metal oxides | 11-16 |
| La$_2$O$_3$ | 1.5-2.9 |
| ZrO$_2$ | 2-4.08 |
| HfO$_2$ | 0.02-3.3 |
| Σ ZrO$_2$ + HfO$_2$ | 2.02-4.1 |
| BaO | 0.4-5 |
| SrO | 0.4-5 |
| Σ alkaline earth metal oxides | 0.4-5 |

-continued

| | |
|---|---|
| Li$_2$O | 1-2.5 |
| Σ SiO$_2$ + ZrO$_2$ + HfO$_2$ | >59; | wherein a molar ratio of ZnO:Σ alkaline earth metal oxides 3.5:1; and wherein the cladding comprises a cladding glass and the cladding glass contains, in Mol % on an oxide basis:

| | |
|---|---|
| SiO$_2$ | 75-85 |
| Al$_2$O$_3$ | 1-5 |
| B$_2$O$_3$ | 10-14 |
| Na$_2$O | 2-8 |
| K$_2$O | 0-1. |

\* \* \* \* \*